United States Patent [19]

Mutziger

[11] 4,218,916
[45] Aug. 26, 1980

[54] DIGITAL THERMOMETER MODIFICATION FOR TELEMETRY AND ANALOG RECORDING

[75] Inventor: John S. Mutziger, East Moline, Ill.

[73] Assignee: Deere & Company, Moline, Ill.

[21] Appl. No.: 11,059

[22] Filed: Feb. 9, 1979

[51] Int. Cl.³ .......................... G01K 1/02; G01K 7/14
[52] U.S. Cl. ................................ 73/359 R; 73/432 A
[58] Field of Search ................. 73/1 F, 362 AR, 359, 73/360, 432 A

[56] References Cited

U.S. PATENT DOCUMENTS

| | | | |
|---|---|---|---|
| 2,886,776 | 5/1959 | Knudsen | 73/1 F |
| 3,060,743 | 10/1962 | Mack | 73/362 AR |
| 3,100,397 | 8/1963 | Peltola | 73/359 |
| 3,203,223 | 8/1965 | Petrow | 73/1 B |
| 3,817,104 | 6/1974 | Sapir | 73/362 AR |
| 4,041,382 | 8/1977 | Washburn | 73/1 F |

*Primary Examiner*—S. Clement Swisher

[57] ABSTRACT

Add-on circuitry for use with an electronic digital thermometer to provide a variable range analog output for applications such as telemetry and analog recording. An analog output circuit has offset and gain adjustments so that its output range can be adjusted to correspond to the desired range of temperatures to be measured without affecting the basic accuracy of the thermometer indicator readout. A circuit is connected to the thermometer input for adjustably simulating, in turn, a low and a high temperature reading corresponding to the limits of the expected temperature range to be measured. As the low temperature is simulated and read from the thermometer indicator, the offset is adjusted to provide the low level analog output. The high temperature is then simulated and the gain adjusted to yield the desired analog output, preferably near full scale. A relay circuit designed to have a low thermocouple effect is used to selectively couple the simulator circuit to the thermometer input without having to disconnect the thermocouple.

11 Claims, 6 Drawing Figures

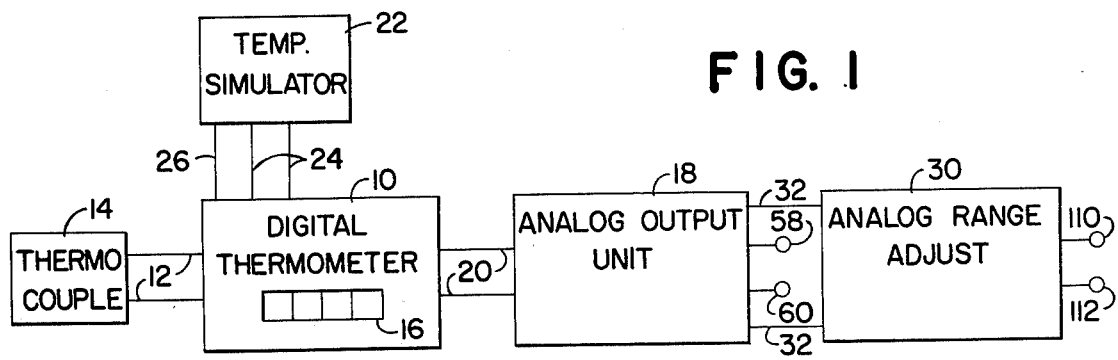
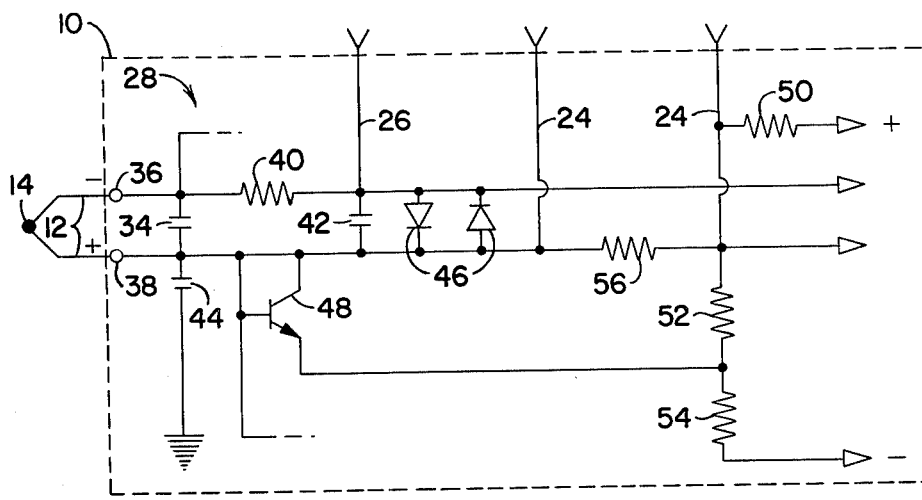
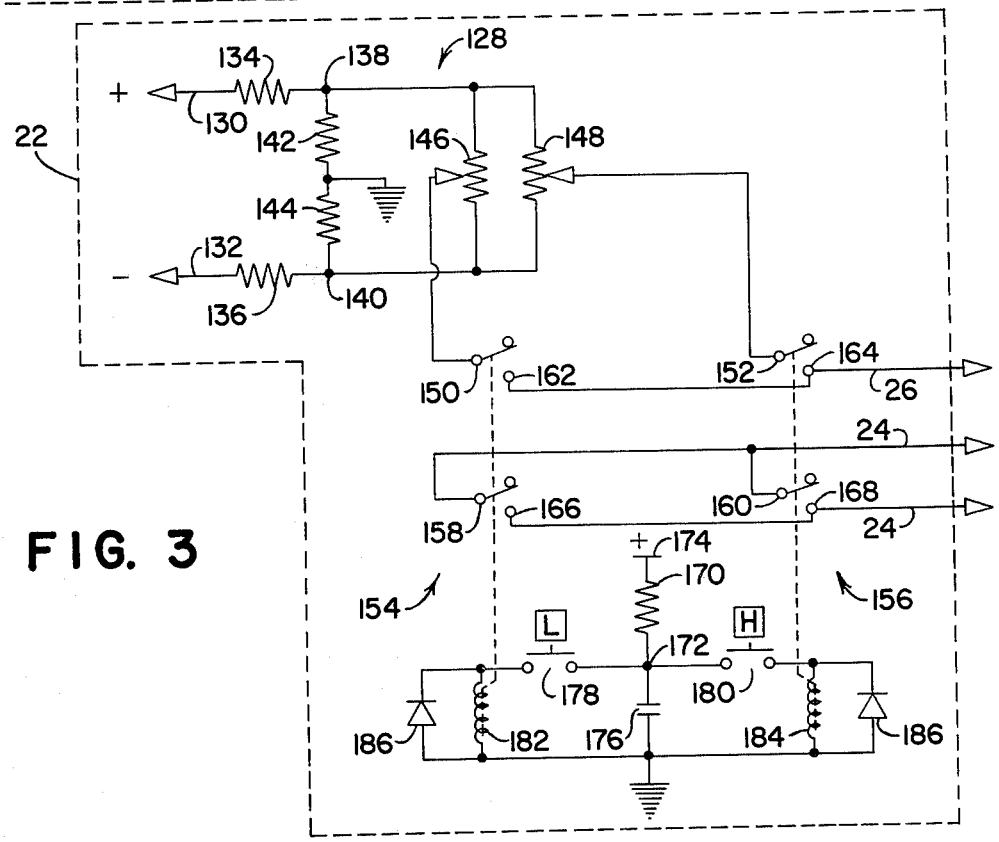

4,218,916

DIGITAL THERMOMETER MODIFICATION FOR TELEMETRY AND ANALOG RECORDING

BRIEF SUMMARY OF THE INVENTION

The present invention relates generally to a temperature measuring system, and more specifically to circuitry for adjusting the analog output scaling of a temperature measuring system.

BACKGROUND OF THE INVENTION

Numerous systems are available today for providing either a continuously variable analog or a digital indication of temperature in which a thermocouple or similar type probe is utilized. The output signal from the thermocouple is processed and a display is provided for giving a visual indication of the temperature. Such a device is shown, for example, in U.S. Pat. No. 3,978,729, and has a digital output which corresponds to the temperature sensed by the probe.

If a digital instrument is utilized to measure temperature and an analog output is required, for example for use with telemetry and analog recording systems, a digital-to-analog converter or similar device customarily is added. The display still provides an indication of the temperature sensed while the converter provides an analog signal which generally varies from a low to a high value as the temperature sensed varies over the complete operating range of the instrument.

Often the range of the temperatures to be monitored lies within only a small portion of the overall range of the instrument. Correspondingly, the analog output variations will be small and difficult to detect. In applications such as telemetry, small variations often lead to errors, and accuracy is lost because the full analog output range is not correlated to the expected range of temperatures to be monitored. A means for easily and reliably adjusting the analog output range is needed that does not affect the accuracy of the instrument and does not require a complicated adjustment procedure or accurate temperature standards for setting the range to correspond to the expected range of temperatures to be monitored. For convenience, the adjustment means should be capable of simulating any temperatures in the range of the instrument.

In accordance with the above, an input circuit is necessary for simulating thermocouple outputs for both the high and low temperatures to be measured while at the same time preventing extraneous thermocouple effects. Relays with low thermocouple effects are available but are relatively expensive.

SUMMARY OF THE INVENTION

Therefore it is an object of the present invention to provide circuitry for use with a temperature measuring instrument to establish a variable range analog output which can be easily adjusted without the use of an accurate temperature standard, or without the need to disconnect the temperature probe or thermocouple from the circuit.

It is a further object of the invention to provide an analog output circuit for a temperature measuring instrument wherein the analog output range is easily adjusted to correspond to a range of temperatures to be measured within the total range of the instrument.

It is yet another object of the invention to provide means for supplying a variable level output from a temperature measuring instrument, the output conveniently adjustable to vary between selected low and high values corresponding to any two temperatures within the range of the instrument. The two temperatures are simulated by a circuit connected to the input of the instrument so that the output range can be adjusted as desired.

It is a further object of the invention to provide circuitry which can be added to an existing thermocouple or probe type temperature measuring instrument with a temperature indicator. Adjustable circuit means is provided for establishing an output which varies over preferably a full-scale range between a high and a low level as the temperature of the thermocouple varies between two values within a portion of the range of the instrument. A circuit is connected to the thermometer input to temporarily and adjustably simulate the probe output for the high and low temperature values which are displayed on the indicator. The circuit means is adjusted for the desired range scaling as the outputs are simulated.

It is still another object to provide for a temperature measuring instrument a means for reliably and conveniently establishing an analog output which varies over a substantial portion of its range as the temperature sensed by the instrument varies between any two preselected temperature values within the range of the instrument. An input circuit simulates the two preselected temperatures, and an analog amplifier is provided with gain and offset controls to adjust the output range to correspond to the simulated temperatures. It is also an object to provide such a means with a switching circuit that minimizes drift and unwanted thermocouple effects due to the calibration circuitry during calibration.

These and other objects and advantages of the present invention will become apparent from the discussion of the preferred embodiment and the drawings.

BRIEF DESCRIPTION OF THE DRAWINGS

FIG. 1 is a block diagram of a temperature measuring system designed in accordance with the present invention;

FIG. 2 is a schematic diagram of a portion of the digital thermometer input circuit with the temperature simulating circuit connected thereto;

FIG. 3 is a schematic diagram of the temperature simulator of the circuit shown in FIG. 1;

DESCRIPTION OF THE PREFERRED EMBODIMENT

Figure 4:
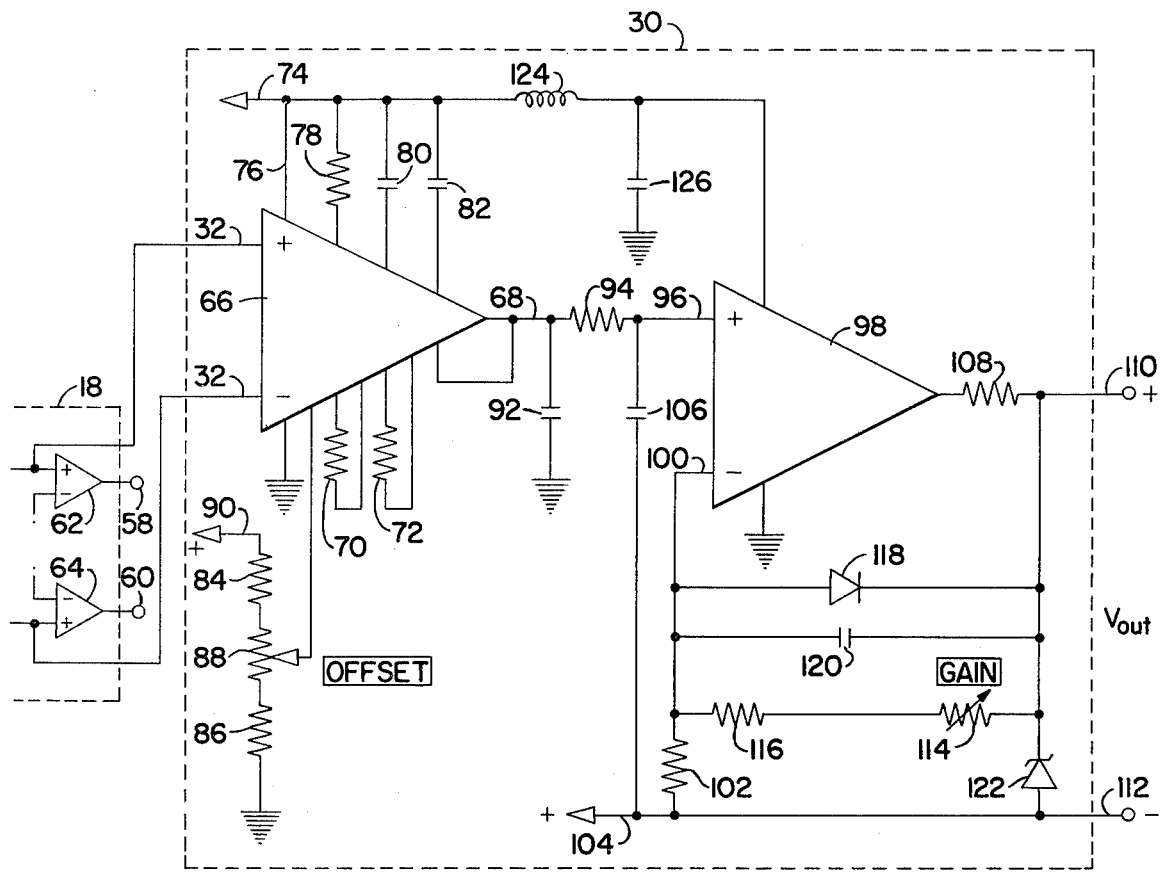
FIG. 4 is a schematic diagram of the analog range adjustment of the circuit shown in FIG. 1.

Referring to FIG. 1 of the drawings, the circuitry of the present invention is shown in conjunction with a digital thermometer 10 having its input connected through input leads 12 to a thermocouple-type probe 14. The probe 14 provides an electrical signal indicative of its temperature over the leads 12 to the input of the digital thermometer 10 which processes the signal and provides a digital readout of the sensed temperature on an indicator 16. In the preferred embodiment the thermometer 10 is a Fluke model 2160A commercially available from John Fluke Mfg. Co., Inc. and capable of measuring over a wide range of temperatures.

An analog output unit or converter 18 is connected through leads 20 to the thermometer 10 to provide an output voltage proportional to the termperature measurement displayed on the indicator 16. Preferably the converter is a Fluke model 2160A-04 Analog Output Unit having an output that varies 1 mv/degree C or F over the temperature range of the intrument. A switch is provided on the unit for selecting centigrade or Fahrenheit scaling.

The add-on circuitry of the present invention includes a temperature simulator circuit 22 connected through a set of leads 24 and 26 to the input circuit 28 (FIG. 2) of the thermometer 10. An analog range adjustment circuit 30 is connected by a pair of leads 32 to the converter 18 for receiving an analog signal indicative of the temperature reading on the indicator 16.

The input circuit 28 includes an R-C filter having a capacitor 34 (FIG. 2) connected across the thermocouple input terminals 36 and 38 and in parallel with an input resistor 40 and a capacitor 42. A capacitor 44 is connected between the terminal 38 and the chassis ground. The filter provides a bypass to minimize errors in strong telemetry RF fields. A pair of protection diodes 46 or similar devices are connected in parallel with the capacitor 42 to protect against voltage overloads at the input.

The input circuit 28 also has a reference junction temperature compensator including a transistor temperature sensor 48. The transistor is forward biased by a voltage divider including resistors 50, 52, and 54 connected in series between a positive and a negative supply voltage. The collector and base of the n-p-n transistor are connected to the terminal between resistors 50 and 52 by a reference junction offset resistor 56 which is chosen to match the particular thermocouple probe 14 connected to the intput. The leads 24 from the simulator 22 are connected across the resistor 56. The emitter of transistor 48 is connected to the terminal between resistors 52 and 54. The transistor 48 is forward-biased and as it senses temperature changes it produces a correction voltage depending on the value of the offset resistor 56. Therefore to disable the reference junction compensator it is only necessary to short out the resistor 56.

The filtered thermocouple probe voltage is processed and a digital section (not shown) which provides linearization of the non-linear probe voltage drives the digital display or indicator 16. Since the digital thermometer 10 is commercially available, only a portion of it has been described in detail to illustrate the points where the temperature simulator circuit leads 24 and 26 are connected to the input circuit 28.

The analog output unit 18 is a standard plug-in unit that converts the linearized temperature information from the digital thermometer 10 into an isolated analog output voltage proportional to the reading on the display 16. Alternatively, the unit 18 could be a digital-to-analog convertor directly connected to the digital unit of the thermometer 10. Typically a voltage change of approximately 1 mv/degree is provided between the outputs 58 and 60 of the unit 18, with the voltage differential being zero when the indicator 16 reads 0° C. The leads 32 from the analog range adjustment circuit 30 are connected to the inputs of a pair of output buffer amplifiers 62 and 64 (FIG. 4) of the circuit 18. A differential output appears across the leads 32 which also typically varies 1 mv/degree. Because the unit 18 is operated from a single polarity supply, the voltage at the leads 32 is maintained several volts above ground, each lead at the same potential of about 2 volts at 0° C., with the lead 58 from the buffer 62 going more positive as the temperature rises above 0° C. while the voltage on the lead 60 remains at 2 volts. The lead 60 from the buffer 64 goes more positive when the temperature reading on 16 falls below 0° C., while the lead 58 remains at 2 volts.

The leads 32 are connected to a high impedance input circuit 66 of the analog range adjustment circuit 30. The circuit 66 is preferably an AD 520K instrumentation amplifier which converts the differential input voltage on lines 32 to a single-ended output at 68. The gain of circuit 66 is set at unity by resistors 70 and 72 connected between pins designated five and seven, and nine and eleven respectively of the AD 520k. Pins two and three are connected to a positive voltage source 74 by a lead 76 and a resistor 78, and pin eight is grounded. Capacitors 80 and 82 are connected between the source 74 and pins thirteen and fourteen. Pins ten and one are connected together and to the output 68. A voltage divider including resistors 84 and 86 and an offset control potentitiometer 88 is connected between ground and a source of positive voltage 90. The wiper arm of the potentiometer 88 is connected to pin twelve of the AD 520K, and as its position is varied to cause the voltage thereon to change, the baseline value of the voltage output at 68 changes without affecting the gain of the circuit 66.

The output 68 of the circuit 66 is connected through a capacitor 92 to ground and through a resistor 94 to the positive input terminal 96 of an operational amplifier 98. The negative input terminal 100 is connected through a resistor 102 to a positive voltage source on line 104. A filter capacitor 160 is connected between the terminal 96 and the line 104. An output resistor 108 is connected between the output of the amplifier 98 and the positive circuit output 110. The other circuit output 112 is connected directly to the line 104. A gain adjustment or variable resistance 114 is connected in series with a fixed resistor 116 between the output 110 and the negative input terminal 100. Also connected in parallel between the terminals 110 and 100 are a limiting diode 118 and a filter capacitor 120. A zener diode 122 is connected between the terminals 110 and 112 to limit the voltage $V_{out}$ for protecting the external equipment. The diode 118 prevents a negative differential output of more than about 0.6 volts from terminal 110 to terminal 112.

The amplifier 98 is connected to the voltage supply 74 through an L-C filter including an inductor 124 and a capacitor 126. Since a single polarity supply is used, both the output 68 of the circuit 66 and the reference level on the line 104 are kept above ground. It is evident from the previous discussion that the differential output voltage $V_{out}$ between the terminals 110 and 112 will remain slightly negative until the voltage level on the output 68 rises above the level on the line 104. The voltage level on the line 68 is determined by the differential input voltage on lines 32 as well as the setting of the offset potentiometer 88. The potentiometer 88 is adjusted so that $V_{out}$ begins to go positive at the lowest expected temperature of the range of temperatures to be measured. The variable resistance 114 is adjusted to provide a gain adequate to yield the maximum $V_{out}$ at the expected high temperature to be measured. The entire adjustment procedure will be discussed in detail below after a description of the temperature simulator circuit 22.

As best seen in FIG. 3, the simulator circuit 22 includes a voltage divider 128 connected between a source of positive voltage 130 and a source of negative voltage 132. Resistors 134 and 136 connect the voltage sources to terminals 138 and 140 which in turn are connected to ground through resistors 142 and 144. A low calibrate potentiometer 146 and a high calibrate potentiometer 148 are connected across the terminals 138 and 140. The resistors 134 and 136, and the potentiometers 146 and 148 have much greater resistance values than the resistors 142 and 144. Therefore there is a positive low voltage at the terminal 138 and a negative low voltage at the terminal 140. The wiper arms of the low and high calibrate potentiometers 146 and 148 are connected to terminals 150 and 152 of relays 154 and 156, respectively, to adjustably provide a voltage signal thereto simulating a typical probe output. Terminals 158 and 160 of the relays 154 and 156 are connected together and to one of the leads 24 from the offset resistor 56. Terminals 166 and 168 are connected together and to the other lead 24 from the offset resistor 56. Terminals 162 and 164 are connected together and to the lead 26 from the input circuit 28.

The activiating circuit for the relays 154 and 156 includes a current limiting resistor 170 connected at a terminal 172 between a positive supply voltage 174 and a storage capacitor 176 which has one lead grounded. Normally open low calibrate and high calibrate switches 178 and 180 are connected between the terminal 172 and relay coils 182 and 184. Each of the coils is connected to ground and in parallel with a diode 186 to prevent negative voltage transients as the associated switch is opened.

When both switches 178 and 180 are open the capacitor 176 charges to the level at the supply 174. When a switch is activated, initially the full supply voltage across the capacitor is applied to the coil to pull the relay in. The voltage then drops as the capacitor partially discharges and the coil current is reduced by resistor 170 to a value just sufficient to hold in the relay, preventing excessive coil heating and minimizing the thermocouple effects of the relay contacts. The limiting resistor 170 also prevents both relays from being activated at the same time.

When the relay 154 is activated by the low calibrate switch 178 the terminals 150 and 162 are connected and the voltage determined by the position of the wiper arm on the potentiometer 146 is applied to the input circuit 28 over the line 26. At the same time, the terminals 158 and 166 are connected to short the leads 24 to short out the reference junction compensation voltage developed across the offset resistor 56 and effectively remove it from the input circuit 28. In a similar manner if the high calibrate switch 180 is closed, the terminals 152 and 164 are connected and the voltage at the wiper arm of the potentiometer 148 is applied to the input circuit 28 over the line 26. The terminals 160 and 168 are connected to short out the offset resistor 56.

Figure 5:
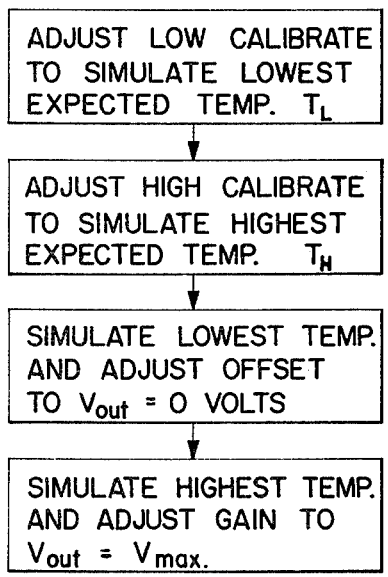
FIG. 5 is a flow chart showing the range adjustment procedure for use with the circuits of FIGS. 1–4.

In operation to calibrate the range of the analog output circuit 30, the procedure briefly outlined in FIG. 5 is followed. Initially the low calibrate switch of the temperature simulator 22 is depressed, pulling in the relay 154 to connect the wiper arm of the low temperature potentiometer 146 to the line 26. At the same time the reference junction compensation voltage is removed by shorting the terminals 158 and 166 so that only the simulated voltage signal will affect the reading on the indicator 16. There is no need to disconnect the thermocouple 14 before calibrating because the simulated signal is injected past the input resistor 40. Input resistor 40 effectively isolates the temperature simulation circuitry voltage from the thermocouple voltage at terminals. With the switch 178 depressed, the potentiometer 146 is adjusted until the desired low temperature to be measured, $T_L$, is read on the indicator 16. The switch 178 is released, and the high calibrate switch 180 is depressed to connect the high calibrate potentiometer 148 to the input circuit 28 while shorting out the reference junction compensation voltage. The potentiometer 148 is then adjusted to provide a voltage signal at the input which causes the temperature indicator 16 to display the desired high temperature to be measured, $T_H$. The switch 180 is released, and the offset and gain controls 88 and 114 (FIG. 4) are ready to be adjusted.

With the low and high calibrate potentiometers 146 and 148 adjusted, first the low calibrate switch 178 is depressed to simulate the low temperature $T_L$ and provide the given differential voltage across the leads 32 for that temperature. At the temperature $T_L$ it is desirable to have the output voltage $V_{out}$ across the terminals 110 and 112 at approximately zero volts. The offset control 88 is adjusted to shift the baseline voltage on output 68 so that at the simulated temperature $T_L$ the voltage at 68 and at 104 are equal. This adjustment will also produce a zero volt output $V_{out}$ from amplifier 98 at line 110 with respect to the line 112.

After the offset 88 is adjusted, the low calibrate switch 178 is released, and the high calibrate switch 180 is depressed to simulate the high temperature $T_H$. The differential voltage across the leads 32, which increases approximately 1 mv/degree, causes the voltage level at 68 to increase an equal amount since the circuit 66 has a gain of unity. The voltage increase drives the output voltage $V_{out}$ more positive. With $T_H$ simulated, the gain control 114 is adjusted to yield the desired maximum output level. After the gain control 114 is adjusted, the high calibrate switch is released and the low calibrate switch 178 is depressed to assure that $V_{out}$ remains at zero volts at $T_L$.

The following is a list of components and values for the circuitry of the preferred embodiment:

| | | |
|---|---|---|
| Resistors, Fixed: | | |
| | 70,72 | 100K |
| | 78 | 400Ω |
| | 84 | 40.2K |
| | 86 | 17.8K |
| | 94,170 | 5K |
| | 102 | 2.49K |
| | 108 | 100Ω |
| | 116 | 4.99K |
| | 134 | 60.4K |
| | 136 | 12.1K |
| Resistors, variable: | | |
| | 88 | 20K |
| | 114 | 100K |
| | 146,148 | 1K |
| Capacitors: | | |
| | 80,92 | .002uf |
| | 82 | 10 uf |
| | 106 | 0.1uf |
| | 120 | 1 uf |
| | 126 | 0.1uf |
| | 176 | 4.7uf |
| Inductors: | | |
| | 124 | 1000uh |
| Supply voltages: | | |
| | 74 | +12V |

|                      |     |          |
|----------------------|-----|----------|
|                      | 90  | +6.2V    |
|                      | 104 | +1.6V    |
|                      | 130 | +15V     |
|                      | 132 | −12V     |
|                      | 174 | +40V     |
| Diodes:              |     |          |
|                      | 118 | 1N914    |
|                      | 122 | 1N4733   |
| Integrated circuits: |     |          |
|                      | 66  | AD 520K  |
|                      | 90  | CA 3130  |

Figure 6:
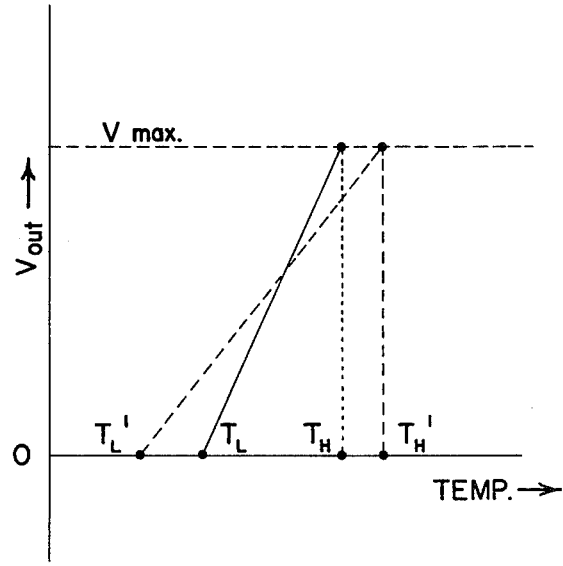
FIG. 6 is graph showing the analog range adjustment circuit output as a function of the actual or simulated temperature sensed by the digital thermometer of FIG. 1 for various offset and gain adjustments.

The add-on circuitry allows expansion of the analog output signal that is proportional to temperature. With the preferred embodiment the voltage scaling is adjustable from approximately 3 mv/degree to 50 mv/degree by adjusting the gain control 114. The offset adjustment 88 allows any temperature reading between approximately −50° F. to +1350° F. to be offset to zero volts across the output terminals 110 and 112. The solid line on the graph in FIG. 6 shows $V_{out}$ as a function of temperature with the offset control set for zero volts out at $T_L$ and the gain control adjusted for full scale at $T_H$. The dotted line shows the effect on $V_{out}$ as the offset is decreased so at a lower temperature $T_L'$ there is zero volts out, and as the gain is decreased so that full scale output occurs at a higher temperature of $T_H'$.

The add-on circuitry does not affect the basic accuracy of the thermometer 10 or the output on the terminals 58 and 60 of the analog unit 18. Since the simulated low and high temperatures of the range to be measured are displayed on the indicator 16 the calibration of the output scaling is simplified and no complicated procedures or accurate temperature standards are required. The relay drive circuit eliminates excess coil heating during calibration and minimizes the thermocouple effect of the relays.

I claim:

1. A system for measuring temperature including temperature responsive means for providing an electrical signal indicative of temperature, and circuit means coupled to the temperature responsive means for receiving the signal, the circuit means including indicator means responsive to the signal for providing an indication of temperature, the improvement comprising:
    output means connected to the circuit means for providing a variable level output signal indicative of the temperature indication provided by the indicator means, the output means including means for adjusting the variable level output signal to provide an output signal variation from a first preselected level to a second preselected level as the indicator means varies between a first and a second temperature indication; and
    signal simulating means connected to the circuit means for selectively providing an adjustable calibrating signal thereto and causing the indicator to indicate a temperature between the temperatures corresponding to the first and second temperature indications, inclusive, regardless of the temperature indicative signal for adjusting the variable level output signal means to provide the output signal corresponding to the calibrating signal.

2. The invention defined in claim 1 wherein the signal simulating means selectively provides the first temperature indication.

3. The invention defined in claim 2 wherein the signal simulating means selectively provides the second temperature indication.

4. A system for measuring temperature including transducer means for providing an electrical signal indicative of temperature, input circuit means for receiving the electrical signal, and signal conditioning means connected to the input circuit means and including readout means for providing an indication of the temperature, the improvement comprising:
    adjustable circuit means coupled to the input circuit means for selectively providing an adjustable signal thereto simulating the electrical signal for a preselected temperature and causing the readout means to provide an indication of the preselected temperature;
    output means connected to the signal conditioning means for providing an output signal which varies between a first level and a second level as the readout means correspondingly varies from a first to a second actual or simulated temperature indication, the output means including means for establishing a first desired level output indicative of the first temperature as the signal for the first temperature is simulated by the adjustable circuit means.

5. The invention defined in claim 4 wherein the output means further includes means for establishing a second desired level output as the signal for the second temperature is simulated.

6. A temperature measuring system including a thermocouple for providing an electrical signal indicative of temperature, an input circuit for receiving the electrical signal, and signal conditioning circuit means connected to the input circuit including an indicator for providing a reading indicative of the temperature, the improvement comprising:
    analog output circuit means connected to the signal conditioning circuit means for providing an output signal having a level which varies with the indicator reading, the output circuit means including adjustable control means for selecting a desired output signal scale variation between a low and a high temperature reading; and
    input simulator means connected to the input circuit for selectively providing a first and a second electrical signal and causing the indicator to read a first and a second temperature, the simulator means including means for adjusting the simulated electrical signals and causing the first temperature reading to correspond to a selected low temperature reading and the second temperature reading to correspond to a selected high temperature reading for adjusting the control means to provide the preselected scale variation while the first and second temperatures are simulated.

7. The invention defined in claim 6 wherein the input simulator means includes switch means operably connecting the means for adjusting and the input circuit for providing in turn the first and the second electrical signal to the input circuit.

8. The invention defined in claim 7 wherein the switch means comprises a relay having predetermined pull-in and hold-in voltages and current means connected to the relay for establishing at least the pull-in voltage and activating the relay, the switch means further comprising means for limiting the current flow through the relay for decreasing the voltage at the relay after activation of the relay to a level below the pull-in voltage but above or equal to the hold-in voltage of the relay to reduce heat build-up therein.

9. A temperature measuring system including thermocouple means for providing an electrical signal indicative of temperature, input circuit means for receiving the electrical signal, the input circuit means including offset means for providing an offset signal to compensate for temperature variations of the input circuit, and a conditioning circuit connected to the input circuit including indicator means for providing an indication of temperature, the improvement comprising:

output circuit means connected to the conditioning circuit for providing an output signal which varies with the temperature indication, the output circuit means including adjusting means for scaling the output signal to vary between a first and a second level as the temperature indication varies between a first and a second temperature indication;

signal means connected to the input circuit means for providing an adjustable calibrating signal thereto and causing the indicator to provide an indication of a temperature between the first and second temperature, inclusive, regardless of the temperature of the thermocouple means; and means for disabling the offset means while the calibrating signal is provided to the input circuit.

10. The invention defined in claim 9 wherein the output circuit includes a gain and an offset control, and the signal means is adjusted to provide, in turn, a first and a second temperature indication whereby the offset control is adjusted while the first temperature is indicated and the gain control is adjusted while the second temperature is indicated.

11. A system for measuring temperature including a temperature responsive device for providing a signal indicative of temperature, and circuit means for receiving the signal and providing an indication of temperature, a circuit for providing an output signal which varies in level over a desired range as the temperature indication varies from a first to second value, comprising:

adjustable signal means connected to the circuit means for selectively providing a first and second signal to the circuit means to cause the temperature indication to indicate in turn the first and second values;

adjustable output means connected to the circuit means and including a variable offset control means for providing an output having a first level when the temperature indication indicates a preselected first temperature, the output means also including a variable gain control means for providing an output having a second level when the temperature indication indicates a preselected second temperature, so the output varies from the first to the second level as the temperature indication varies from the first to the second preselected temperature; and wherein the signal means is adjustable for selecting the first and second values to correspond to the preselected first and second temperatures, respectively.

* * * * *